US009843450B2

(12) United States Patent
Kravitz et al.

(10) Patent No.: US 9,843,450 B2
(45) Date of Patent: *Dec. 12, 2017

(54) SYSTEM AND METHOD TO USE A CLOUD-BASED PLATFORM SUPPORTED BY AN API TO AUTHENTICATE REMOTE USERS AND TO PROVIDE PKI- AND PMI-BASED DISTRIBUTED LOCKING OF CONTENT AND DISTRIBUTED UNLOCKING OF PROTECTED CONTENT

(71) Applicant: T-Central, Inc., Dover, DE (US)

(72) Inventors: David W. Kravitz, San Jose, CA (US);
Donald Houston Graham, III, Pasadena, CA (US); Josselyn L. Boudett, Clearwater, FL (US); Russell S. Dietz, San Ramon, CA (US)

(73) Assignee: T-CENTRAL, INC., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,598

(22) Filed: Aug. 3, 2017

(65) Prior Publication Data
US 2017/0331633 A1    Nov. 16, 2017

Related U.S. Application Data

(63) Continuation of application No. 15/409,427, filed on Jan. 18, 2017, now abandoned, which is a (Continued)

(51) Int. Cl.
*H04L 29/06* (2006.01)
*H04L 9/32* (2006.01)
*H04L 9/08* (2006.01)

(52) U.S. Cl.
CPC .......... *H04L 9/3263* (2013.01); *H04L 9/0894* (2013.01); *H04L 63/061* (2013.01);
(Continued)

(58) Field of Classification Search
None
See application file for complete search history.

(56) References Cited

U.S. PATENT DOCUMENTS

| 5,812,671 A | 9/1998 | Ross, Jr. |
| 6,584,567 B1 | 6/2003 | Bellwood et al. |

(Continued)

FOREIGN PATENT DOCUMENTS

CN       105791272 A   *   7/2016

OTHER PUBLICATIONS

Mizuno, M., Yamada, K., and Takahashi, K., Authentication Using Multiple Communication Channels, pp. 54-62, http://c11.acm.orgicitation.cfm?id=1102496, Nov. 11, 2005.
(Continued)

*Primary Examiner* — Amir Mehrmanesh
(74) *Attorney, Agent, or Firm* — Lewis Roca Rothgerber Christie LLP

(57) ABSTRACT

System and method for authenticating a computer user includes: sending an invitation message from an entity computer to an API for authenticating a user of a user computer; receiving and translating by the API the invitation message and sending the translated invitation message including the first public key to the platform server; sending an invitation response to the API to be translated and sending the translated invitation response to the entity computer; preparing a first message including a link and a unique code by the entity computer and sending the first message to the user computer; registering with the platform server utilizing the link and the unique code, and generating a second public key, by the user computer; receiving a correct answer to the secret from the user computer; receiving the second public key by the platform server; and authenticating the user based on the received correct answer.

10 Claims, 2 Drawing Sheets

Related U.S. Application Data continuation of application No. 15/154,864, filed on May 13, 2016, now Pat. No. 9,578,035, which is a continuation of application No. 14/715,588, filed on May 18, 2015, now Pat. No. 9,356,916, which is a continuation-in-part of application No. 14/218,897, filed on Mar. 18, 2014, now Pat. No. 9,270,663, which is a continuation-in-part of application No. 13/481,553, filed on May 25, 2012, now abandoned, which is a continuation-in-part of application No. 13/096,764, filed on Apr. 28, 2011, now abandoned.

(60) Provisional application No. 62/133,371, filed on Mar. 15, 2015, provisional application No. 61/994,885, filed on May 17, 2014, provisional application No. 61/792,927, filed on Mar. 15, 2013, provisional application No. 61/650,866, filed on May 23, 2012, provisional application No. 61/490,952, filed on May 27, 2011, provisional application No. 61/330,226, filed on Apr. 30, 2010, provisional application No. 61/367,576, filed on Jul. 26, 2010, provisional application No. 61/416,629, filed on Nov. 23, 2010.

(52) U.S. Cl.
CPC ............ *H04L 9/321* (2013.01); *H04L 9/3271* (2013.01); *H04L 63/10* (2013.01); *H04L 63/20* (2013.01)

(56) References Cited

U.S. PATENT DOCUMENTS

| | | |
|---|---|---|
| 6,941,454 B1 | 9/2005 | Spraggs |
| 6,996,841 B2 | 2/2006 | Kadyk et al. |
| 7,093,121 B2 | 8/2006 | Barton et al. |
| 7,100,054 B2 | 8/2006 | Wenisch et al. |
| 7,493,661 B2 | 2/2009 | Liu et al. |
| 7,571,325 B1 | 8/2009 | Cooley et al. |
| 7,600,011 B1 | 10/2009 | Urbanek |
| 7,831,693 B2 | 11/2010 | Lai |
| 7,966,646 B2 | 6/2011 | Chou et al. |
| 8,069,435 B1 | 11/2011 | Lai |
| 8,275,984 B2 | 9/2012 | Loveless |
| 8,346,929 B1 | 1/2013 | Lai |
| 2005/0044197 A1* | 2/2005 | Lai .......... G06Q 10/10 709/223 |
| 2005/0240758 A1 | 10/2005 | Lord et al. |
| 2007/0174410 A1 | 7/2007 | Croft et al. |
| 2007/0198836 A1 | 8/2007 | Fedyk et al. |
| 2008/0222736 A1 | 9/2008 | Boodaei et al. |
| 2009/0083538 A1 | 3/2009 | Merugu et al. |
| 2009/0111424 A1 | 4/2009 | Bengtsson et al. |
| 2009/0150968 A1 | 6/2009 | Ozzie et al. |
| 2012/0023593 A1 | 1/2012 | Puder et al. |
| 2013/0262857 A1 | 10/2013 | Neuman et al. |
| 2013/0312065 A1* | 11/2013 | Abeyweera ............ H04L 51/12 726/3 |

OTHER PUBLICATIONS

Renaud, K., Cooper, R. and Al Fairuz, M., A Support Architecture for Multi-Channel Multi-Factor Authentication, http://www.dcs.gla.ac.uk/~karen/Papers/mca.pdf, Oct. 13, 2008.

RSA SecurID [Mtp://www.emc.comisecurityirsa-securid.htm)

SafeNet OTP authenticators [http://www.safenet-inc.com/data-protection/ authentication/otp-authentication/].

SafeNet eTokens and SafeNet eToken 3500 specifically [http://www.safenet-inc.com/products/data-protection/two-factor-authentication/etoken3500/].

2D barcode that is scanned and decrypted via a user's mobile device YouTube demo http://www.youtube.com/watch?v=9GbFVcC7aBc.

2D barcode that is scanned and decrypted via a user's mobile device http://~rw.woodwing.com/en/blog/article/2d-barcodes-publishing.

2D barcode that is scanned and decrypted via a user's mobile device http://blog.nyaruka.com/2d- barcode-error-correction.

2D barcode that is scanned and decrypted via a user's mobile device http://www.quickmark.cn/En/basic/index.asp.

2D barcode that is scanned and decrypted via a user's mobile device http://uvsar.blogspot.com/2009/05/secure-qr-and-qm-codes.html.

2D barcode that is scanned and decrypted via a user's mobile device http://www.quickmark.com.tw/en/basic/downloadPC.asp.

* cited by examiner

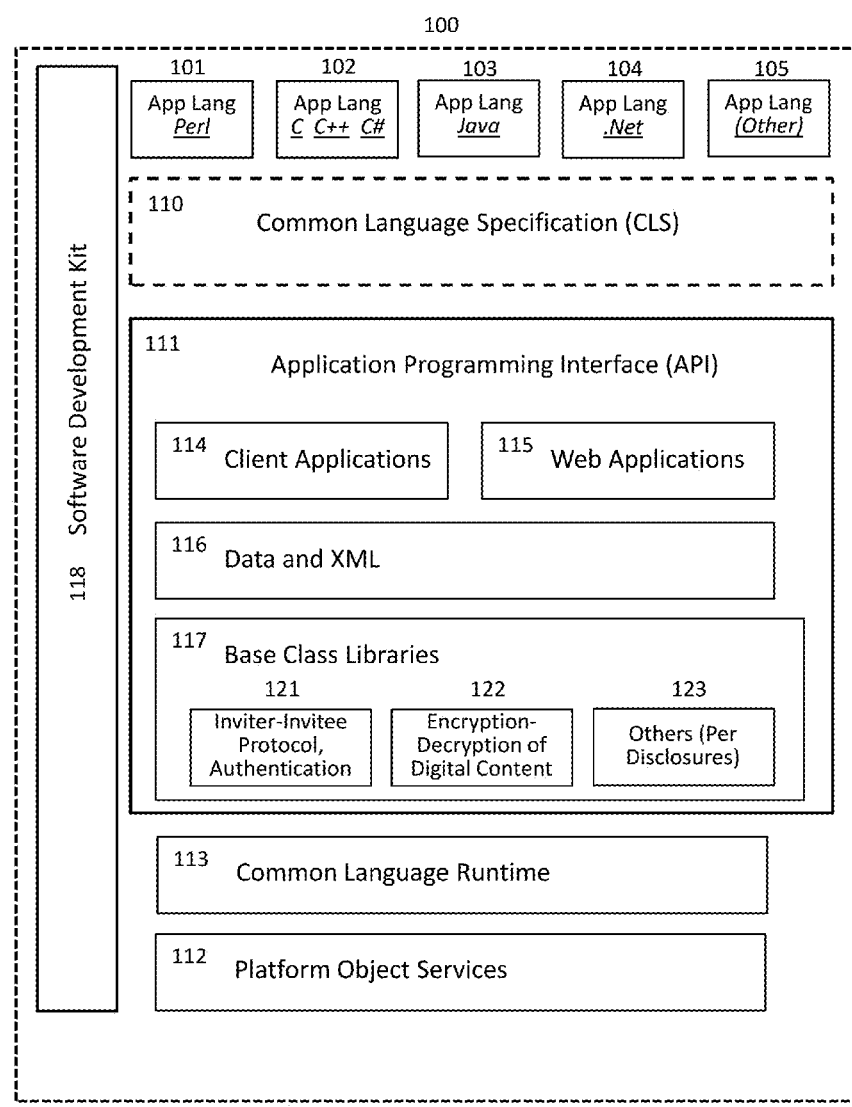
Figure 1: Framework for API and Platform Integration

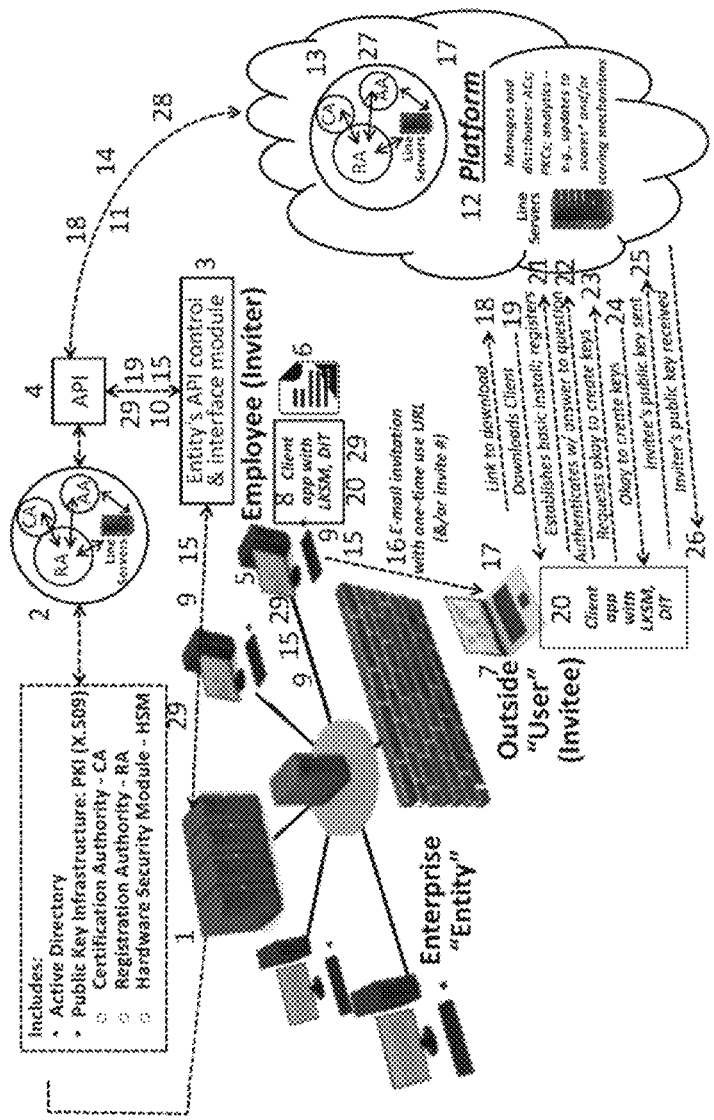

SYSTEM AND METHOD TO USE A CLOUD-BASED PLATFORM SUPPORTED BY AN API TO AUTHENTICATE REMOTE USERS AND TO PROVIDE PKI- AND PMI- BASED DISTRIBUTED LOCKING OF CONTENT AND DISTRIBUTED UNLOCKING OF PROTECTED CONTENT

CROSS-REFERENCE TO RELATED APPLICATIONS

This application is a continuation of U.S. patent application Ser. No. 15/409,427, filed Jan. 18, 2017, which is a continuation of U.S. patent application Ser. No. 15/154,861, filed May 13, 2016, (now U.S. Pat. No. 9,578,035), which is a continuation of Ser. No. 14/715,588, filed May 18, 2015, (now U.S. Pat. No. 9,356,916), which claims priority from U.S. Provisional Application No. 62/133,371, filed Mar. 15, 2015, and U.S. Provisional Patent Application No. 61/994,885, filed May 17, 2014, and is a continuation-in-part of Ser. No. 14/218,897, filed Mar. 18, 2014, (now U.S. Pat. No. 9,270,663), which claims priority from 61/792,927, filed Mar. 15, 2013, and is a continuation-in-part of Ser. No. 13/481,553, filed May 25, 2012, which claims priority from U.S. Provisional Patent Application No. 61/650,866, filed May 23, 2012 and U.S. Provisional Patent Application No. 61/490,952, filed May 27, 2011, and is a continuation-in-part of Ser. No. 13/096,764, filed Apr. 28, 2011, which claims priority from U.S. Provisional Patent Application No. 61/416,629, filed Nov. 23, 2010; and U.S. Provisional Patent Application No. 61/367,576, filed Jul. 26, 2010; and U.S. Provisional Patent Application No. 61/367,574, filed Jul. 26, 2010; and from U.S. Provisional Patent Application No. 61/330,226, filed Apr. 30, 2010, all of which are incorporated herein by reference and for all purposes.

BACKGROUND

Field of the Described Embodiments

The present disclosure relates generally to providing one or more Application Programming Interfaces (APIs) integrating with a Platform Service (either Cloud, local server-based, or other) to provide access and use of one or more of the Platform's features. An example of one such feature could be to enable the extension of security credentials for entities such as enterprise businesses, government, small businesses, individuals, systems integrators, independent software vendors and others, "Entity(ies)", in order to effectuate more secure communication between an Entity and one or more remote third parties (for example, from an enterprise Entity to a third-party customer beyond that enterprise Entities' network firewall).

Most Entities are faced with similar, common security challenges. For many of such challenges, positive security solutions can sometimes be achieved through the use of cryptography. Cryptographic security solutions typically require well-tested solutions which can be challenging to execute and deliver reliably and securely, even for professional experienced in the field. According to Bruce Schneier (respected cryptographer, computer security & privacy specialist, and writer): " . . . two cryptography truisms. The first is that cryptography is hard . . . The second is that cryptographic implementation is hard . . . and "We're great at mathematically secure cryptography, and terrible at using those tools to engineer secure systems." For these reasons, well-designed, well-executed, tested, cryptographic tools that provide useful and flexible solutions that meet actual security needs can be difficult for those Entities to produce for themselves. Therefore, a Platform and API with useful and tested cryptographic solutions could be of benefit to those Entities.

The Platform with its API(s) and Software Development Kit (SDK) may make it easier and simpler for software designers, application developers, Entities and others to add sophisticated cryptographic security solutions to their applications and/or Entity software solutions. The Platform, API, and related technology may allow them to devote more time to meeting software requirements rather than dealing with the unique challenges of developing secure cryptographic systems, thereby reducing overall development time.

SUMMARY OF THE DESCRIBED EMBODIMENTS

Application programmers, including application developers, often provide Users with software applications that enable various services for the User. For example, an application may be provided to a user to authenticate the identity of a remote third party with whom the user desires to establish an authenticated, secure communication line (as described later herein). In such a case, the application programmer or platform service provider provisions an API with the authentication feature and exposes various inputs to permit the user to activate the feature to implement the feature. The application programmer may implement the service of authentication based on knowledge of application programming interfaces (APIs) that are offered by various technology service and/or platform providers. Each platform or service provider tends to have proprietary or specific APIs used to invoke the services it offers. The application programmer utilizes the APIs provided by the provider, with the appropriate parameters, to invoke the desired feature (e.g., authentication of a remote third party).

API (Application Programming Interface) may include a set of routines, protocols, and tools for building software applications that utilize those specific routines, protocols and tools. Generally an API is considered to be a software component in terms of its defined operations, inputs, outputs, and underlying types. The Platform API may define and provide access to (and use of) the unique functionalities of the Platform. A software developer may incorporate the API into his/her software application. An API may make it easier to develop a software application by providing some of the building blocks required by an application developer, which he/she may then put together.

APIs may be created and offered using various methods such as SOAP (SOAP stands for Simple Object Access Protocol, and is XML based). Another is REST (short for Representational State Transfer). REST uses standard HTTP methods. More description of common API technology can be found at <http://en.wikipedia.org/wiki/Application_programming_interface>.

A Platform is often hosted in the Cloud (e.g., "Cloud computing"; "Platform as a Service"). Cloud computing (see http://en.wikipedia.org/wiki/Cloud_computing). At the foundation of cloud computing is the broader concept of converged infrastructure and shared services. Cloud computing, or in simpler shorthand just "the cloud," also focuses on maximizing the effectiveness of the shared resources.

The Platform, as disclosed herein, may also be hosted on a server within an Entity business network or elsewhere other than in the Cloud.

The Platform may support application developers to build software by employing the SDK tools to better use the capabilities of the API in order to control, access and utilize the features and functions of the Platform. Using any of these capabilities, for this disclosure, an Entity and/or User could gain access to one or more of the security, authentication, cryptographic, and other capabilities as disclosed herein and/or priority claims hereof, including U.S. Provisional Patent Application Nos. 61/994,885 and 62/133,371.

The Platform and API solutions disclosed herein may provide a User-Directed, Authenticated, Cryptography-Enabling, Security-Focused Ecosystem (the "Security Ecosystem" as described in Appendix A of Application No. 62/133,371) through which an Entity and/or an Entity's "Users" (i.e., customers, clients, prospects, vendors, associates, employees, and/or others with whom an Entity may have a need to share sensitive information) can use one or more of the components of the Security Ecosystem to address one or more security challenges encountered by an Entity and/or User.

Some examples of capabilities that might be accessed through the Platform and API may include (but are not limited to) the following features: Cross-Certification (the Platform may cross-certify an Entity's authorized identities with those of another trusted Entity that also uses the Platform; cross-certification may result in identities on one Entity being recognized by another Entity in order to facilitate inter-Entity, secure, point-to-point encrypted communication with trusted identities). Go Paperless with Users (may eliminate some printing and postage costs of sending statements and/or invoices (and/or other digital content) and/or alternatively the cumbersome practice of requiring Users to login and manually retrieve such digital content, by implementing a process of encrypting such digital content, thus allowing for such digital content to their authenticated recipients for decryption). Digital Transaction Signing (which may support regulatory and/or business needs by providing non-repudiable authorization for some high value transactions, e.g., money transfers, account changes, medical orders, access authorization, etc.). Digital Signatures (may provide an Integrated, Persistent, Non-Repudiable Digital Signature capability between an Entity and a User and/or another Entity that could facilitate the efficiency and reliability of remote document execution). Audit Trails (may provide an integrated Digital, Non-Repudiable, verifiable Audit Trail capability confirming chain of custody, access, etc. of encrypted digital files which, in turn, may reduce fraud). Two-Factor ("2-Factor") Authentication (may provide an integrated, digital, 2-factor authentication capability to greatly enhance the reliability of remote authentication and approvals as compared to common SMS messaging techniques). Tunable Security (the platform and/or API may include a series of configurable authorization controls, limitations and monitoring capabilities, together with tunable security tools and such features may be configured controlled by an Entity and/or Users.)

Benefits of the possible solutions that could be offered through the Platform and API are numerous with some of them being described as one or more of the following: a core security solution together with add-on, customizable features that can integrate and evolve with existing security solutions; a capability to enable an Entity to invite Users or individuals to a secure communication line without exposing the Entity Infrastructure; a function to allow an Entity system administrator to track, monitor and/or audit transmitted encrypted digital content; a capability to create a separate database of associates and affiliates, including the right to revoke any invitation or relationship; a capability for an Entity to send encrypted digital content outside an Entity firewall with a result being that such digital content may be as secure (or more secure) than within that firewall; a capability to integrate Platform and/or API data records with Active Directory (or a similar system) as well with an Entity's PKI (Public Key Infrastructure); a reduction in "Data Spawn" (i.e., a tendency of unencrypted sensitive digital content to be copied and transferred to another person, Entity and/or location and possibly copied and transferred repeatedly with a result being that the original sensitive digital content may become located in multiple places and/or with multiple individuals or entities, thus reducing its security) through the capabilities of the Platform and API whereby digital content may be transferred to multiple places and/or with multiple individuals or entities in an encrypted format and may be stored in an encrypted format, thus reducing an uncontrolled and/or un-audited distribution of unencrypted sensitive digital content.

The actions of the Platform may be selectively changed, controlled and utilized via the API through Entity-written code, thus providing application-specific security software required by an Entity or end User (such functions may be unique, custom, common or generic). The functionality of the Platform may include the cryptographic security functionality desired by the Entity to provide it with one or more needed products, functions, solutions, capabilities, etc. For example these may include: the inviter-invitee protocol; authentication functions; audit trail capabilities; or other products, functions, solutions, capabilities etc. as described in this disclosure and/or its priority claims, etc.

A Platform SDK (Software Development Kit) may include a set of software development tools that may allow a software developer to create custom software applications to utilize the capabilities of the Platform and/or API. A Platform and/or API in general may also be used or accessed by other Platforms. An example of this is the Uber platform (www.uber.com) which uses the Twilio API and platform (www.twilio.com) for the telecommunications needs that Uber provides to its users (e.g., a text that "your Uber driver has arrived"). Another example is that Uber also uses the Braintree API and platform (www.braintreepayments.com) for processing Uber customers' credit card payments.

One problem to address could be long-stalled "going-paperless" initiatives of some Entities: securely delivering statements, invoices, and other digital content to their Users as opposed to postal mail or the inconvenient "come and get it" paradigm (requiring Users to log into Entity websites and manually retrieve such digital assets. Billions of documents need to be delivered annually from Entities to their Users. Mail is expensive. The "come and get it" paradigm of Users logging onto Entity websites is only partially successful. The "going-paperless" problem is a manifestation of a broader problem confronting Entities: lack of a user-friendly, workable, authenticated, secure B2C and B2B communication capability. It is a challenge today for Entities to easily and securely exchange sensitive digital content with those outside their networks. The Platform and API Security Ecosystem's integrated software capabilities can ensure that the sensitive digital content, etc., that Entity users send to third parties who are off the Entity network can be delivered securely and privately to their correct, authenticated recipients.

The Platform and API Security Ecosystem's software is generally oriented to reduce impact on the existing manner in which Entity users create, store and transmit digital content to others. The Platform and API Security Ecosystem generally does not transport, store or have access to user's encrypted data. The Platform and API Security Ecosystem generally attempts to provide security to user's digital assets by providing a system to protect those assets though encryption, both in transit and at rest.

For Users the Platform and API Security Ecosystem may provide a tool so that Users may communicate privately, securely and with confidence not only with their authenticated friends, family and associates, but also with their user-created groups (e.g., schools, teams, clubs, political organizations, etc.)

The Platform and API Security Ecosystem (either directly or through Entities) may offer Users a downloadable application to install on a desktop or mobile device that will "lock" (encrypt) and "unlock" (decrypt) digital content using a cryptographic standard such as Advanced Encryption Standards (AES 256) as well as possibly other optional protocols. An authenticated, authorized recipient of a digital file may open it; locked files should not be viewable by advertisers, email or cloud providers, governments or others; private encryption keys can be held generally by their owners; and identities may be authenticated through user-managed tools.

As stated on Page 1 of Appendix B of Application No. 62/133,371 (as well as on Page 1 of Application No. 61/792,927), "The various inventions described herein contemplate functions or services fulfilled through service provider involvement. As stated in the various referenced APPENDICES, functions or services and/or data and/or keys may be split across multiple service providers or servers or systems and/or across multiple components of a given service provider or server or system." "Server" may also be considered to be a "computing device" with a processor(s) and memory.

Such splitting of functions or services and/or data and/or keys ("Items") across multiple service providers or servers or systems and/or across multiple components of a given service provider or server or system applies to the nature of flexibility of configurations relative to how those Items could be located on a Platform and/or a Line Server within the network infrastructure of an Entity and/or elsewhere. Such embodiments of the invention are suggested and/or described in the descriptions following the above quoted sections in the above priority filings.

BRIEF DESCRIPTION OF THE DRAWINGS

The present disclosure is described in greater detail below, with reference to the accompanying drawings, in which:

FIG. 1 is a block diagram of an illustrative architecture for interface and integration between the network of an Entity, an API and a Platform; and FIG. 2 is a flowchart illustrating an embodiment of the invention through the establishment of an authenticated relationship with an outside third party.

DETAILED DESCRIPTION

Referring to FIG. 1, an integration framework 100 is provided to support application developers that develop applications and services for Entities and/or Users in order to use the functions and services offered by the Platform and API. This framework may accommodate development in multiple languages (101, 102, 103, 104, 105, etc.) together with seamless integration by supporting those languages. The framework may support common open protocols (e.g., REST & SOAP). The framework may provide integrated class libraries for each of the programming languages supported. In one embodiment Common Language Specification (CLS) 110 allows designers of various languages to write code that is able to access underlying library functionality of the Platform Object Services layer 112. The specification 110 functions as a contract between language designers and library designers that can be used to promote language interoperability. By adhering to the CLS, libraries written in one language can be directly accessible to code modules written in other languages to achieve seamless integration between code modules written in one language and code modules written in another language. (More information on Common Language Specification can be found under Common Language Infrastructure on Wikipedia: <http://en.wikipedia.org/wiki/Common_Language_Infrastructure>).

The framework 100 includes an application program interface (API) layer 111. The API layer 111 presents groups of functions that the applications 101-105 can call to access the resources and services provided by Platform Object Services layer 112. By exposing the API functions for multiple Platform services, application developers can create Web applications and/or direct application calls that can generate, control and/or make full use of the Platform resources, without needing to understand the complex interworking of how those cryptographically sophisticated Platform resources actually operate or are made available. Moreover, the Web applications can be written in any number of programming languages, and may be translated into an intermediate language supported by a common language runtime 113 and included as part of the Common Language Specification 110. In this way, the API layer 111 may provide methods to access all of the Platform resources. Additionally, the framework 100 can be configured to support API and/or direct calls placed by remote Client Apps of the service (see 20 in FIG. 2). This framework may modified for Entity and/or User purposes, particularly if a User is using a limited or dedicated function device, such as a mobile device (tablet, cellular phone, etc.).

Referring to FIG. 2, an Enterprise Entity has a network infrastructure, 1, including servers, workstations, firewall, Active Directory, Public Key Infrastructure (PKI), etc. In this embodiment it has a component of the invention with a separate Registration Authority-Certification Authority-Attribute Authority-Line Servers combination, 2 (which in another embodiment may not be present in the enterprise network environment). Both this and the Entity's API Control & Interface Module 3 interface with the API 4. On the workstation 5 of an Employee of the Entity, there is a sensitive plain test document (digital content) 6 that the employee would like to send to an Outside User 7. Using an installed Client App (which includes a Local Key Store Module—LKSM) 8 the employee (now an "Inviter") enters a request 9 into the Client App to invite the Outside User (now an "Invitee") to share a secure communication line between the two of them. The request 9 travels across the network to the Entity's API control and interface module 3. In conformance with the specifications of the API, the API control and interface module 3 transmits an invitation request message 10 to the API. The API transmits a translated message 11 to the Platform 12. The functions and services of the Platform 13 prepare an invitation response message 14 that is returned to the API 4. In accordance with a specification, the API converts the response to a message 15 understandable by the API control and interface module 3. The API control and interface module transmits the message 15 across the network to the Client App 8 on the Inviter workstation 5. The Client App prepares a message that the Inviter can send in an email 16 which arrives at the Invitee 17. The Invitee may click on a link in the email (or visits a designated website and enter a unique invitation code which is provided in the email) to download 18 the client app. The client app is downloaded 19 and installed 20. With the basic install completed, the client is registered 21 with the Platform. From the Platform the Invitee is asked a secret question (supplied by the Inviter in the original invitation request) to which the Invitee is expected to know the answer and upon supplying that answer, the installation of the LKSM is authenticated 22 with the Platform and the system. The Client App requests permission 23 to make certain cryptographic keys (including a Digital Identity Token—DIT). This is done upon approval 24 from the Platform with the Invitee's public keys then being sent 25 to the Platform. The Inviter's public key is received from the Platform 26 (which had received it upon the initial installation of the Inviter's Client App). The functions and services of the Platform 27 process and store this data and prepare a message 28 that is returned to the API 4. In accordance with a specification, the API converts this message to a message 29 understandable by the API control and interface module 3 and the Client App 8. The API control and interface module transmits the message 29 across the network to the Client App 8 on the Inviter workstation 5. The Client App 8 updates its LKSM with the invitation authentication and stores the Invitee's public key.

What is claimed is:

1. A method for authenticating a computer user in a computer network, the computer network including an entity computer, a platform server, a user computer and an application programming interface (API) for communication between the entity computer and the platform server, the method comprising:
    sending an invitation message from the entity computer to the API for authenticating an identity of a user of the user computer, the invitation message including a first public key of the entity computer and a secret question with an answer;
    receiving and translating by the API the invitation message and sending the translated invitation message including the first public key to the platform server;
    preparing an invitation response by the platform server and sending the invitation response to the API;
    receiving and translating the invitation response by the API and sending the translated invitation response to the entity computer;
    preparing a first message including a link and a unique code by the entity computer and sending the first message to the user computer;
    receiving the first message, registering with the platform server utilizing the link and the unique code, and generating a second public key, by the user computer;
    sending the secret question to the user computer by the platform server;
    receiving a correct answer to the secret from the user computer;
    receiving the second public key by the platform server;
    authenticating the identity of the user of the user computer based on the received correct answer; and
    receiving the first public key from the platform server, by the user computer, after said authentication of the identity of user of the user computer;
    preparing a second message by the platform server including the second public key and transmitting the second message to the entity computer via the API; and
    establishing a secure communication line between the entity computer and the user computer, utilizing the first public key and the second public key, wherein
    said secure communication line is authenticated using a certificate received from a certificate authority.

2. The method of claim 1, wherein said platform server includes a public key infrastructure system.

3. The method of claim 1, wherein the user computer utilizes security or cryptographic functions of the platform server to establish the secure communication line.

4. The method of claim 1, wherein the user computer invokes a digital signature generation key pair and at least one of key establishment key pair, encryption-decryption key pair, or digital signature verification to authenticate the identity of the user of the user computer and establish the secure communication line.

5. The method of claim 1, further comprising delivering secure content from the entity computer to the user computer.

6. A system for authenticating a computer user in a computer network comprising:
    a control computer coupled to the computer network for executing an application programming interface (API);
    a user computer coupled to the computer network;
    an entity computer coupled to the computer network for sending an invitation message to the API for authenticating an identity of a user of the user computer, the invitation message including a first public key of the entity computer and a secret question with an answer; and
    a platform server coupled to the computer network for providing security or public key infrastructure functions, wherein the API receives and translates the invitation message and sends the translated invitation message including the first public key to the platform server, wherein
    the platform server prepares an invitation response and sends the invitation response to the API, wherein
    the API receives and translates the invitation response and sends the translated invitation response to the entity computer, wherein
    the entity computer prepares a first message including a link and a unique code by and sends the first message to the user computer, wherein
    the user computer receives the first message, registers with the platform server utilizing the link and the unique code, and generates a second public key, and wherein
    the platform server sends the secret question to the user computer and receives a correct answer to the secret and the second public key from the user computer, and authenticates the identity of the user of the user computer based on the received correct answer, wherein
    the user computer receives the first public key from the platform server, after said authentication of the identity of user of the user computer, wherein the platform server prepares a second message including the second public key and transmits the second message to the entity computer via the API and establishes a secure communication line between the entity computer and the user computer, utilizing the first public key and the second public key, and wherein
    said secure communication line is authenticated using a certificate received from a certificate authority.

7. The system of claim 6, wherein said platform server includes a public key infrastructure system.

8. The system of claim 6, wherein the user computer utilizes security or cryptographic functions of the platform server to establish the secure communication line.

9. The system of claim 6, wherein the user computer invokes a digital signature generation key pair and at least one of key establishment key pair, encryption-decryption key pair, digital signature verification or digital identity token to authenticate the identity of the user of the user computer and establish the secure communication line.

10. The system of claim 6, wherein the entity computer delivers secure content to the user computer via the established secure communication line.

* * * * *

UNITED STATES PATENT AND TRADEMARK OFFICE
CERTIFICATE OF CORRECTION

PATENT NO. : 9,843,450 B2
APPLICATION NO. : 15/668598
DATED : December 12, 2017
INVENTOR(S) : David W. Kravitz et al.

Page 1 of 1

It is certified that error appears in the above-identified patent and that said Letters Patent is hereby corrected as shown below:

On the Title Page

Page 2, Column 1, Line 1, under item (63), Related U.S. Application Data

Delete "15/154,864",

Insert --15/154,861--

Page 2, Column 2, Line 11, under item (56) References Cited, Other Publications

Delete "http://www.youtube.com/watch?v=9GbFVcC7aBc",

Insert --http://www.youtube.com/watch?v=9GbFVcQ7aBc--

Signed and Sealed this
Eleventh Day of December, 2018

Andrei Iancu
*Director of the United States Patent and Trademark Office*